United States Patent [19]

Welman

[11] Patent Number: 5,557,799
[45] Date of Patent: Sep. 17, 1996

[54] COMPUTER DETERMINATION OF OPERATING SYSTEM OR DATA

[75] Inventor: Glenn E. Welman, Lexington, Ky.

[73] Assignee: International Business Machines, Armonk, N.Y.

[21] Appl. No.: 609,051

[22] Filed: Nov. 7, 1990

Related U.S. Application Data

[63] Continuation of Ser. No. 497,473, Mar. 22, 1990, abandoned.

[51] Int. Cl.⁶ .................................... G06F 9/00
[52] U.S. Cl. .................. 395/700; 364/280.2; 364/975.2; 364/DIG. 1
[58] Field of Search .................... 364/900, 200, 364/DIG. 1, DIG. 2; 395/700

[56] References Cited

U.S. PATENT DOCUMENTS

| | | | |
|---|---|---|---|
| 3,805,247 | 4/1974 | Zucker et al. | 364/200 |
| 3,996,449 | 12/1976 | Attanasio et al. | 340/825.34 |
| 4,070,704 | 1/1978 | Calle et al. | 364/200 |
| 4,439,837 | 3/1984 | Aiena et al. | 364/900 |
| 4,493,034 | 1/1985 | Angelle et al. | 364/200 |
| 4,530,052 | 7/1985 | King et al. | 364/200 |
| 4,590,556 | 5/1986 | Berger et al. | 364/200 |
| 4,590,557 | 5/1986 | Lillie | 364/200 |
| 4,626,986 | 12/1986 | Mori | 364/200 |
| 4,654,783 | 3/1987 | Veres et al. | 364/200 |
| 4,663,707 | 5/1987 | Dawson | 364/200 |
| 4,675,814 | 6/1987 | Murai et al. | 364/300 |
| 4,720,812 | 1/1988 | Kao et al. | 364/900 |
| 4,747,040 | 5/1988 | Blanset et al. | 364/200 |
| 4,777,590 | 10/1988 | Durkos et al. | 364/200 |
| 4,939,507 | 7/1990 | Beard et al. | 340/706 |

OTHER PUBLICATIONS

John Angermeyer and Kevin Jaeger, "Ms–DOS Developer's Guide", The Waite Group, 1986, pp. 181, 285–299.
Peter Norton, Richard Wilton; The New Peter Norton Programmer's Guide To The IBM PC and PS/2, 1985, 1988 pp. 109–111, 157–159, 247–248.
Russ Davies: Mapping The IBM PC and PCjr, 1985.
Disk Operating System Verison 3.30 Technical Reference (International Business Machines Corporation 1987), pp. 1–4 (DOS) (Davies).
PC System Programming, Sections 6.3, 6.13 (pp. 196–198), and 7.1 (Abacus 1991) (PC Ssytem) (Tischer).

Primary Examiner—Kevin A. Kriess
Assistant Examiner—L. Toplu
Attorney, Agent, or Firm—Michael J. Buchenhorner; Laurence R. Letson

[57] ABSTRACT

A personal computer when attempting to boot from a diskette (5) searches the boot record of the diskette for com. When found, com and the eight characters preceding com in the boot record are compared with the first two entries of the directory of the diskette. If no match is found, the personal computer responds on the basis of the diskette being a data diskette. Otherwise, the personal computer executes the boot record of the diskette. This minimizes error messages and operator involvement.

5 Claims, 6 Drawing Sheets

COMPUTER DETERMINATION OF OPERATING SYSTEM OR DATA

This is a continuation of U.S. patent application Ser. No. 07/497,473 filed Mar. 22, 1990, now abandoned.

TECHNICAL FIELD

This invention relates to computers which load operating systems from variable data memories, typically interchangeable diskettes. Such memories may contain only data, not an operating system, and this invention relates to loading the contents as an operating system on one determination and proceeding to other stored code on another determination.

RELATED PATENT APPLICATIONS

U.S. patent applications entitled "Flexible Computer Initialization," by R. L. Bertram et al, Ser. No. 497,384 and U.S. patent application entitled "Power On Computer Initialization," by R. L. Bertram et al, Ser. No. 497,373; both filed on the date this application was filed and on both of which the inventor of this application is a joint inventor, teach the setting of internal memory bits to vary machine operation, the status of which influence the operation of this invention.

BACKGROUND OF THE INVENTION

Personal computer diskettes and similar memories may contain an operating system or may contain only data. Many operating systems are outstanding and will be developed in the future. The loading of an operating system to control the computer (commonly termed booting or to boot) typically includes reading the diskette to establish that the diskette is not a formatted diskette, which carries a single code repetitively. If that test is satisfied, the typical system passes booting control to the code on the diskette. When that code proves not to constitute an operating system, the computer will signal an error and wait for operator intervention. The signal typically is a message telling the operator to insert a system diskette and once again initiate booting. Thus, an error message and operator action are inevitable unless the operator has inserted a diskette having a valid operating system.

The majority of operating systems employ a similar convention for placing the operating system on the diskette and for including code defining the information on the diskette. Different versions of various operating systems do implement the conventions slightly differently as to where key information is located on the diskette. This invention employs such conventions to determine with high probability of accuracy whether a diskette contains an operating system, permitting automatic booting of an alternate operating system and therefore minimal delay and operator inconvenience. Since normally a diskette left in the computer drive by mistake will be a data diskette, rather than a system diskette, automatically attempting to boot on code in an alternative memory often is consistent with the original intent of the operator.

As illustrated in FIG. 3, it is conventional for personal computers to boot from the code in alternative memory locations when no diskette or a formatted diskette is found in the original code examined for booting. Ultimately, these conventional systems execute Basic, a well-known operating system, from code stored in the permanent memory (termed read only memory or ROM) of the personal computer.

DISCLOSURE OF THE INVENTION

In accordance with this invention, assuming detection of valid data in a memory being examined for boot information, the memory is then examined for code bytes representing c, o, and m. If com is not found, booting is conducted on the code in that memory. When com is found, the directory of the memory is searched for and, if a valid directory is found, the first two entries are examined for a match with a predetermined number of characters followed by com in the boot-information memory. If either of those entries satisfy that comparison, booting is conducted on the code in that memory.

When either com is not found or the match with a directory entry is not found, computer operation proceeds to attempt booting from code in a different memory. Accordingly, an error message does not occur unless the alternative booting fails or unless that booting actually attempted from code in the first memory fails, both of which will be relatively rare.

The ultimate effect is that diskettes containing only data normally do not impede the process of starting a personal computer with built-in or alternative operating system when the diskette is in the diskette drive. Yet, when the diskette is a system diskette, that operating system is loaded, also without operator intervention.

BRIEF DESCRIPTION OF THE DRAWING

The details of this invention will be described in connection with the accompanying drawing, in which.

BEST MODE FOR CARRYING OUT THE INVENTION

Figure 1:
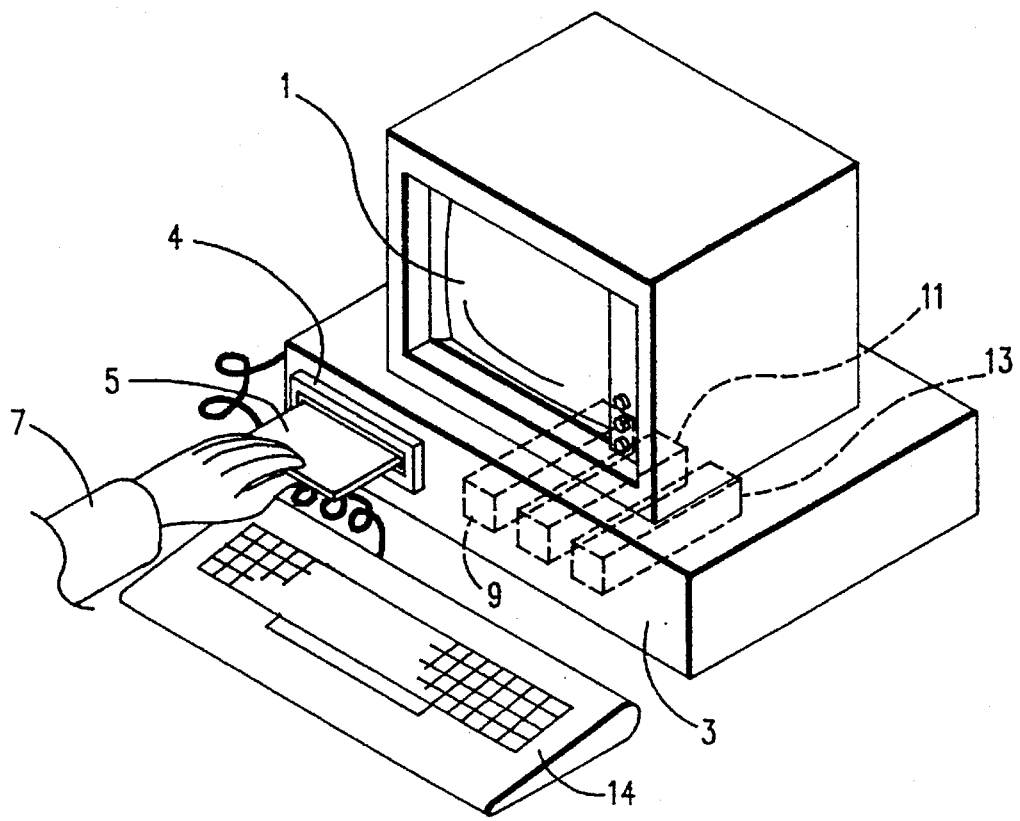
FIG. 1 is a perspective view illustrating a personal computer employing this invention.
Figure 2:
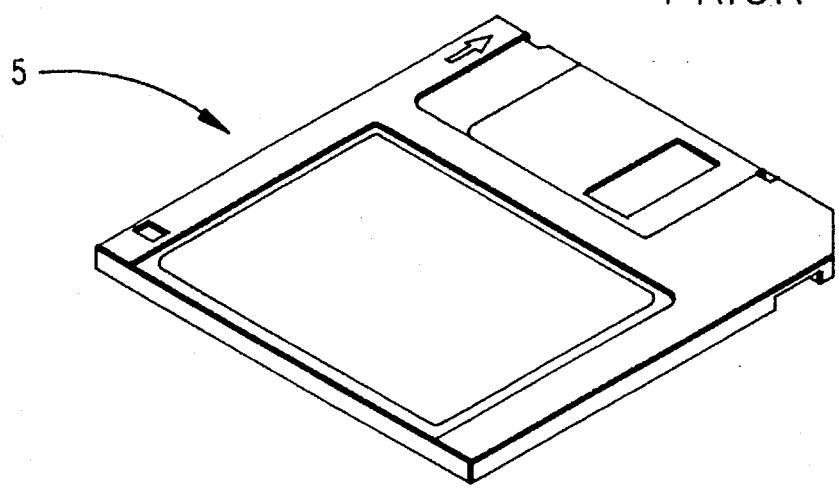
FIG. 2 is a perspective view of a prior art diskette employed in the personal computer.

The preferred system is a personal computer, which is basically conventional, having a display 1, a system unit 3 and a diskette drive 4 to receive a diskette 5 and to read and write code to the diskette 5. A diskette 5 is inserted or not inserted as selected by a human machine operator 7. The personal computer contains essentially standard logic and memory comprising a microprocessor 9, read only memory (ROM) 11, and random access memory (RAM) 13. ROM 11 contains permanent code, as is standard. The system also comprises a keyboard 14 for entry of data and commands.

This invention is a modification or addition to standard data processing capabilities. In order to facilitate understanding of this invention, such capabilities will be described in some detail here.

Power-on self test (POST)—The sequence of operations controlled by internal code or logic to bring the computer into operation from its most initial state, such as to bring the computer into a ready state after the computer has been powered down. POST controls a number of internal checks and operations readying hardware and setting the content of RAM 13. Subsequently, POST controls loading of an operating system, after which POST is terminated. Such loading of an operating system is the primary area of interest with respect to this invention. In standard PC systems, POST examines a diskette 5 first for an operating system.

Sectors of disks—Disks such as diskette 5 are operationally (not physically) divided into concentric tracks carrying magnetic code, with each track carrying code which divides the track into several sectors. Diskettes such as diskette 5 currently are available in different densities which have 18 sectors per track for the more dense and 9 sectors per track for the other density. Sectors of both have 512 bytes of executable system or data code bytes. A formatted disk is written with the same byte everywhere. Disks carrying executable code have sectors defined by a timing pattern of code, followed by address information defining its track, sector, and side (called head zero or head 1 for the opposite sides), followed by a check byte, followed by the 512 executable bytes, and ending with a check byte.

Boot record—One sector in the outermost track carries the address track zero, sector 1 (the convention is that there is no sector zero), and head zero. The last two bytes of executable code of that sector normally carry a unique signature code when the content constitutes an operating system. The executable code in that sector is termed a boot record, regardless of whether the content is data or an operating system. Although the signature code is standard with boot records, typically the existence of eight bytes of code different from the format code in the first eight positions of executable code at track zero, sector 1, head zero are tested without regard to the signature code to define the data as a boot record.

Command.Com—The heading designation used in code for a routine in IBM Disk Operating System (IBM DOS) and compatible operating systems which provides a number of common or fundamental capabilities to the computer when activated by the associated operating system. Typical functions defined by Command.Com are the following: 1) directory (e.g., typing dir, followed by an enter key results in the listing on display 1 of all files in the diskette 5), 2) view (e.g., typing type xxxxx, followed by an enter key results in the file xxxxx being displayed decoded as standard ASCII code), 3) execute xxxxx (e.g., typing xxxxx followed by an enter key, provided xxxxx is not a reserved command name, results in a search of the directory in the diskette 5 for xxxxx as a file name, and the loading and executing of that file. Command.Com provides many more functions which constitute a point of communication between the machine operator and the computer, typically employing keyboard 14.

IBMBIO##COM and IBMDOS##COM—These are the first two entries (where # represents a space or blank) in the directory for the IBM DOS operating system. Compatible machines may have, for example XXBIO###COM and XXDOS###COM as the first two items, but they all are eleven characters ending in COM in standard ASCII code. These give the address for the code of the BIOS (basic input output system) and DOS (disk operating system), the BIOS being routines to control input and output of code and the DOS being routines to define the transfer of code between the microprocessor 9 and the disk, such as diskette 5. For purposes of this invention BIOS and DOS may be entirely conventional.

A boot record for an IBM DOS or compatible operating system will almost inevitably contain in standard ASCII notation IBMBIO##COM and IBMDOS##COM or ibmbio##com or ibmdos##com or the equivalents for compatible systems just mentioned, each being eleven bytes of code ending in COM or com. However, a diskette carrying only data for such an operating system will often carry IBMBIO##COM or ibmbio##com or the equivalent eleven byte code as part of the data in the boot record as that is frequently used.

Figure 3:
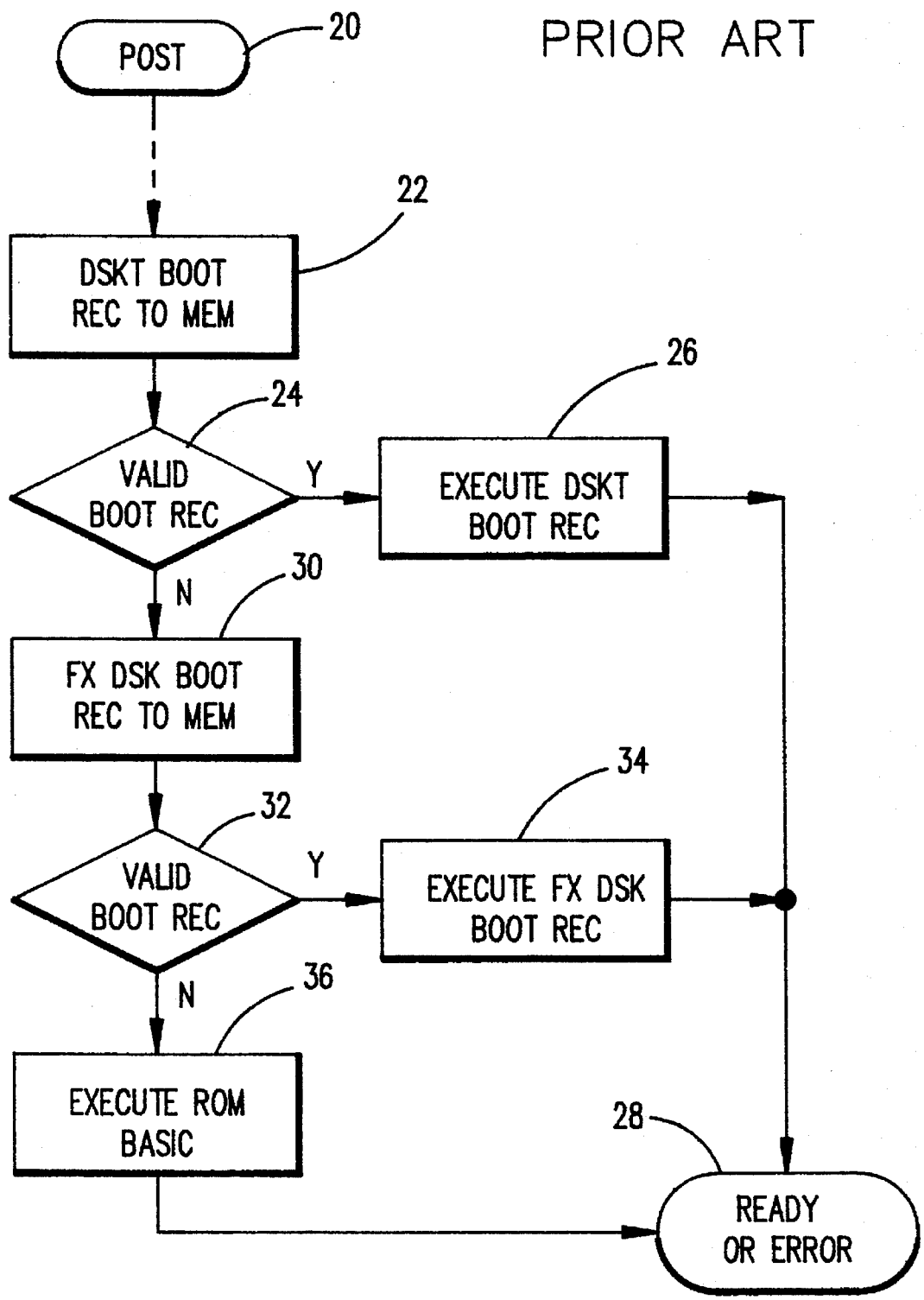
FIG. 3 illustrates a currently-standard sequence of operation of booting by such a computer.
Figure 4A:
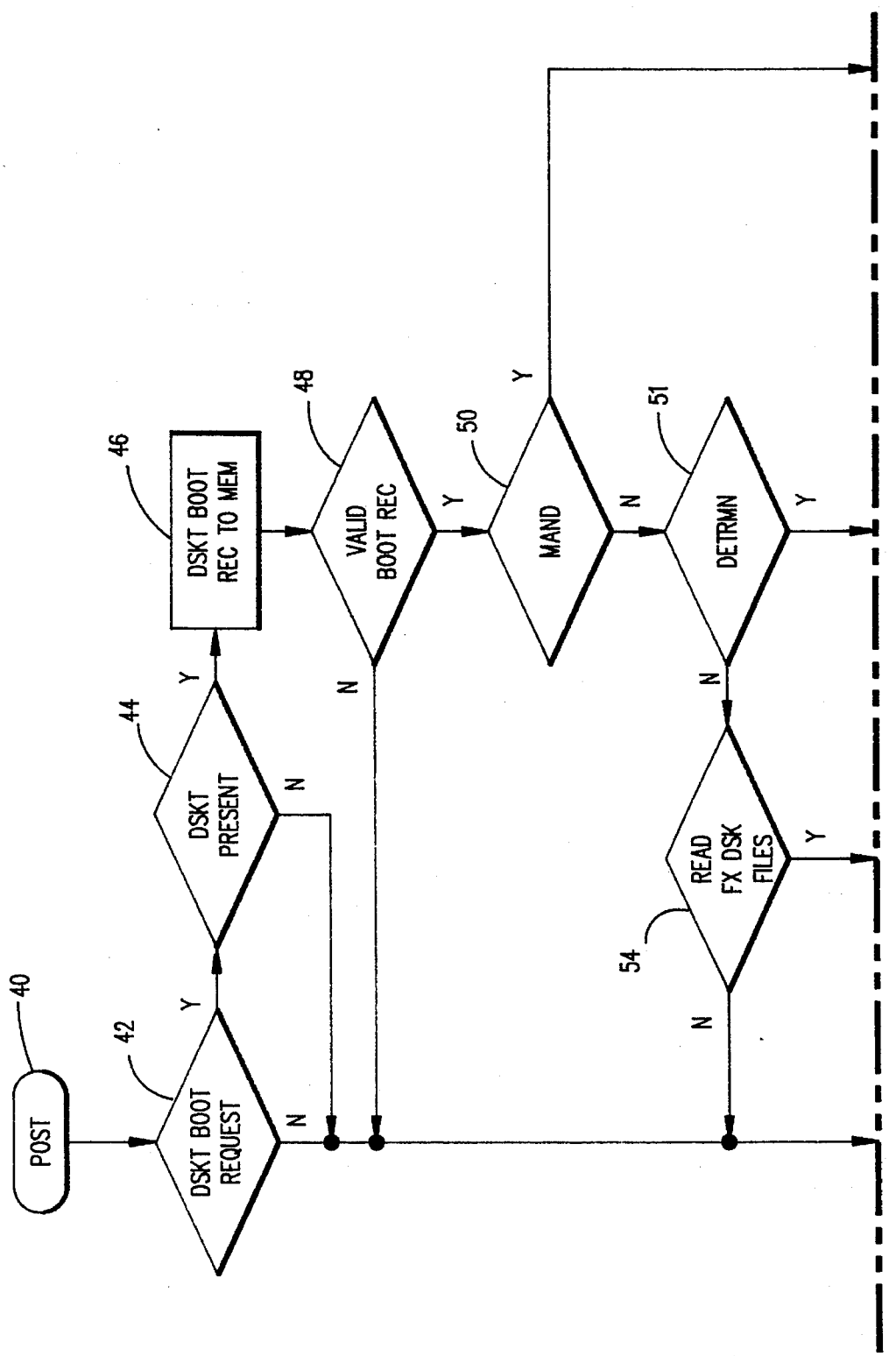
FIG. 4, consisting of 4A–4D, illustrates the sequence of booting in accordance with this invention.
Figure 4B:
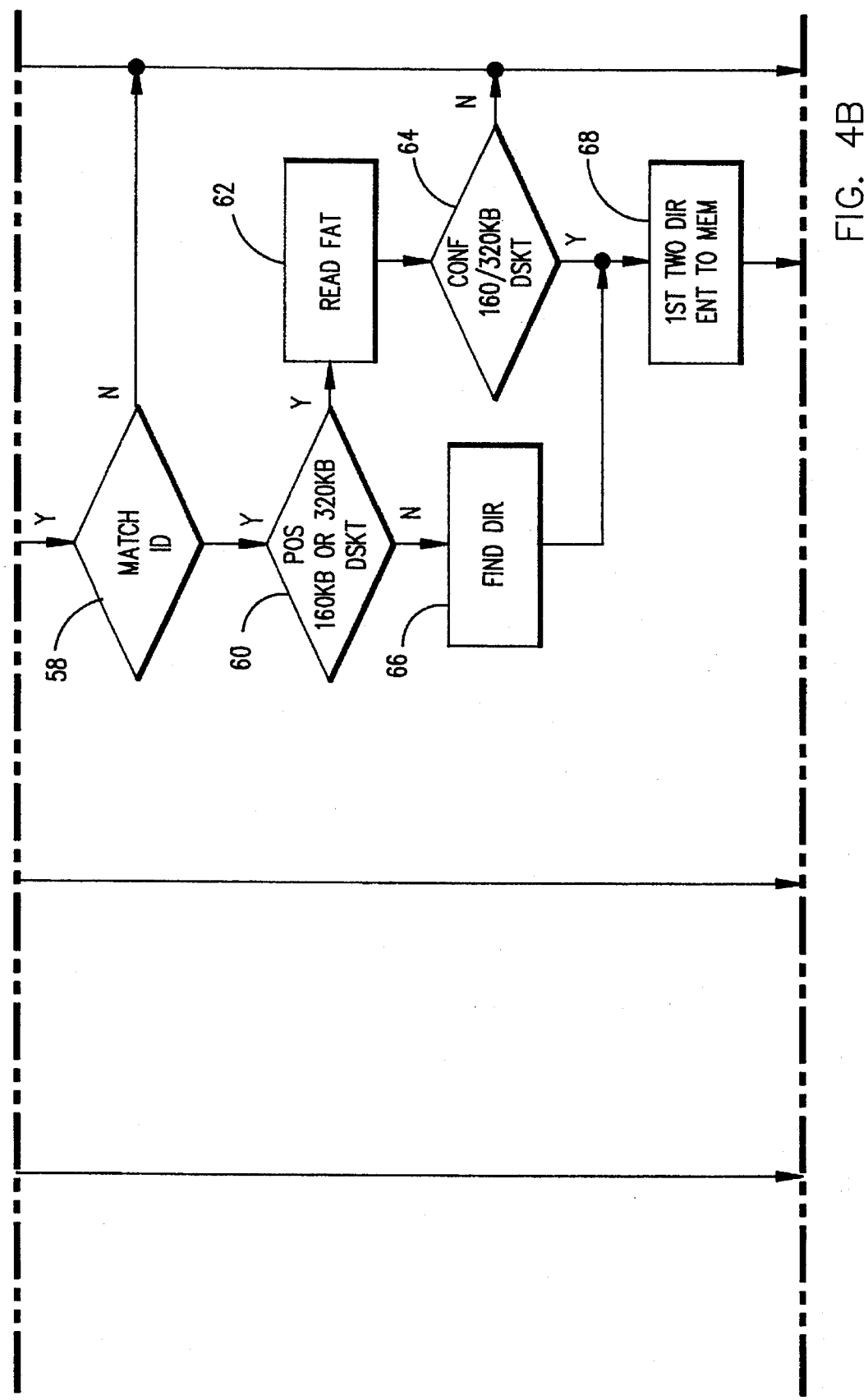
Figure 4C:
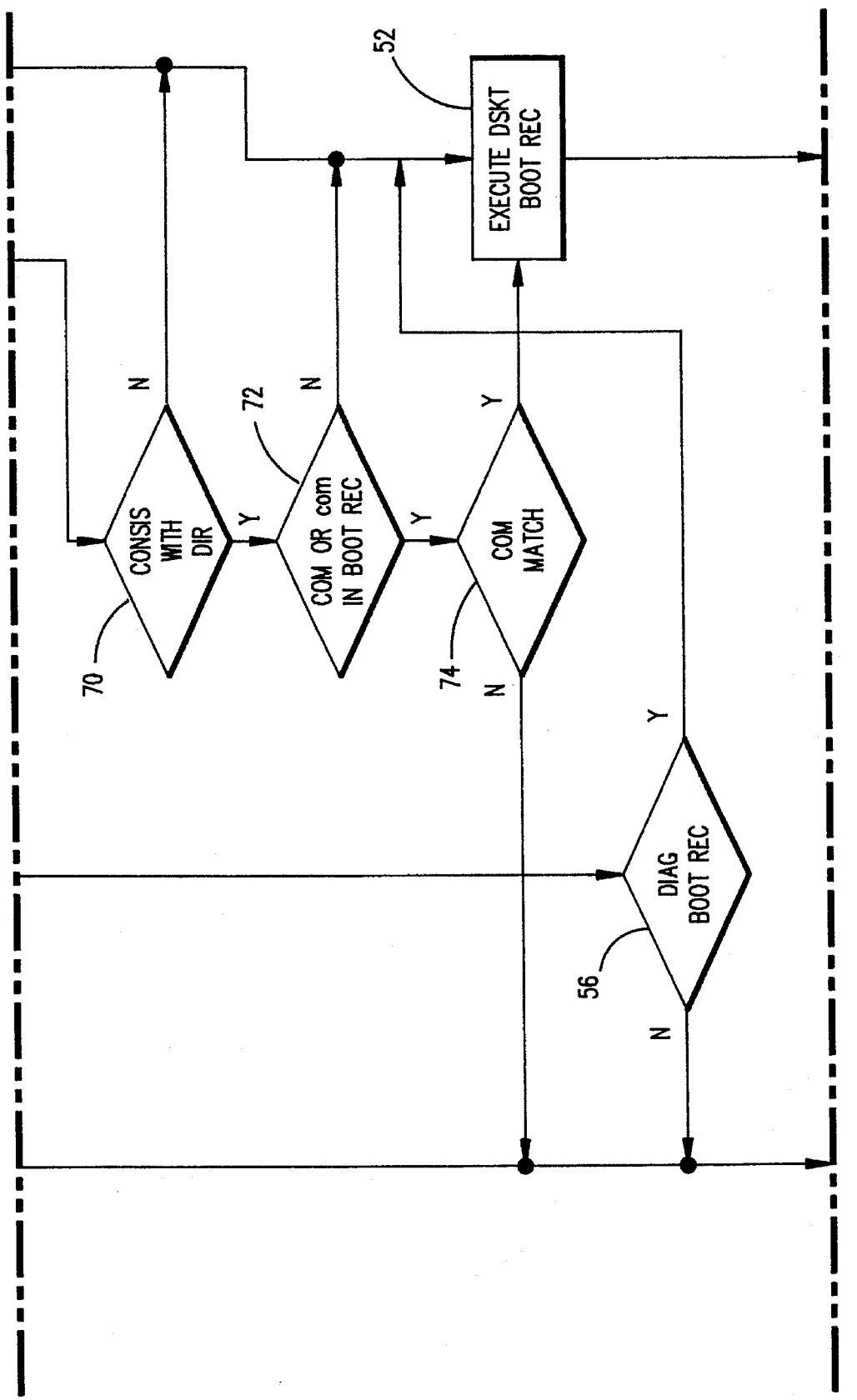
Figure 4D:
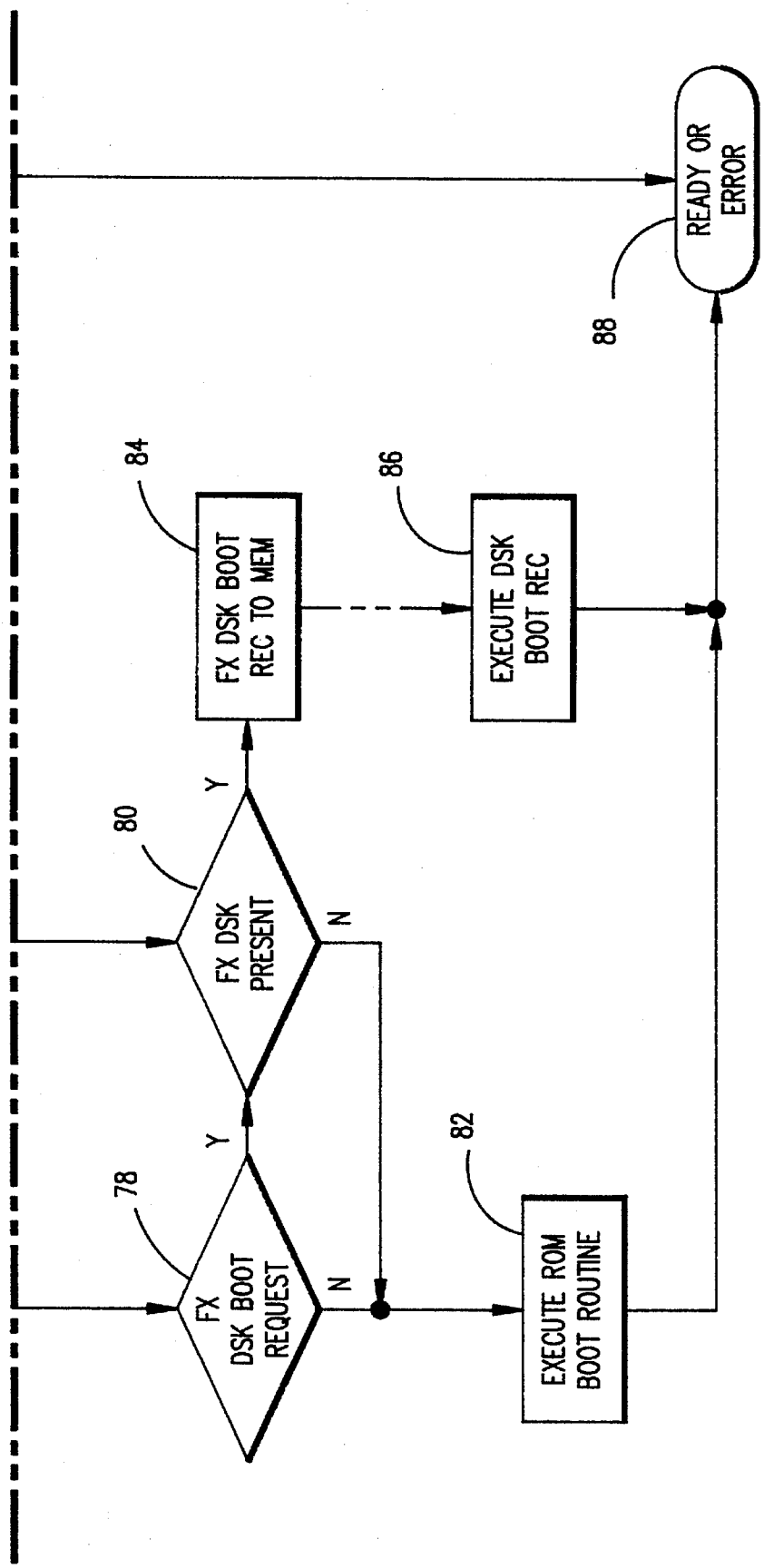

Reference is made to FIG. 3 which shows typical prior art booting from POST 20 which this invention modifies. After much of POST 20 has been executed successfully, POST 20 conducts function 22 of reading the 512 data bytes of track zero, sector 1, head zero on diskette 5 into RAM 13. In action 24 the first eight bytes of that data are examined in microprocessor 9 to determine if they are each different from the format byte. If yes, the data is acted on as a valid boot record and function 26 takes place in which microprocessor 9 executes the boot record, resulting in installation of the operating system stored on the diskette 5 or a failure of installation, producing ready or error message 28. A ready condition from function 26 constitutes the completion of POST 20.

POST 20 installs an operating system, in both the prior computers described in FIG. 3 and in this invention, by loading the first two bytes of the 512 data bytes of the boot record in microprocessor 9 as an instruction. This is a jump instruction to instructions in the 512 bytes for loading a part (called the kernel) of the operating system into RAM 13. Control is then passed to the kernel. The kernel determines the address of the directory from information stored in the boot record and locates routines such as Command.Com from the directory and loads them as appropriate. Much of the operating system remains on the diskette 5 or other disk and is loaded by the kernel into RAM 13 as needed.

When action 24 does not find a valid boot record on a diskette, such as diskette 5, the prior system will automatically proceed to attempt to boot from a fixed disk (not shown) permanently installed in system unit 3. Fixed disks are generally faster than operator installable diskettes 5, but not all computers have fixed disks.

The 512 bytes of data from track zero, sector 1, head zero of the fixed disk are read into RAM 13 in function 30. In action 32 the first eight bytes of that data are examined in microprocessor 9 to determine if they are each different from the format byte. If yes, the code is executed in function 34 in the same manner as described for function 26, resulting in a ready or error message 28. If not, function 36 installs a Basic operating system stored in ROM 11, resulting in ready or error message 28.

Referring to FIG. 4, the invention of this embodiment is as follows: POST 40 proceeds to installation conventionally with respect to this invention. At action 42 POST 40 examines permanent memory sites of RAM 13 which define whether booting from diskette 5 is to be attempted. Specifically, this is one memory bit to define whether booting is to be attempted at all from external memory, one memory bit to define whether content determination of a diskette is in accordance with this invention is to be determined, one memory bit to define whether an Autoexec.bat routine (a routine which loads preselected other routines so that the operator need not load them individually) is to be taken from fixed disk and used with an operating system not from fixed disk, and finally one memory bit to define whether Config.Sys (a routine to configure the computing system to work with certain peripheral devices, such as printers and added memory) is to be taken from fixed disk and used with an operating system not from fixed disk. If any of these is yes, the result of action 42 is yes.

If action 42 is yes, action 44 senses a switch which is physically positioned by the presence of diskette 5 in drive 3. (Although the switch is existing in some prior computers, use in the booting operation is not known. Sensing of a physical presence switch for fixed disk during booting is known, with attempt to boot from the fixed disk being terminated if presence of the fixed disk is not shown by the switch.)

If action 44 determines yes, function 46 moves the data of track zero, sector 1, head zero to RAM 13 memory as described for function 22 of the prior art. Action 48 then determines if the data is a valid boot record by examining the first eight bytes as described for action 24 of the prior art. If yes, action 50 examines a bit of permanent memory RAM 13 which defines whether booting from diskette 5 is mandatory. If yes, function 52 executes boot record data as described for function 26 of the prior art.

If action 50 is no, action 51 examines a permanent memory bit of RAM 13 which defines whether or not the content of diskette 5 is to be determined. If no, action 54 examines a permanent memory site of RAM 13 which defines requirements which can only be satisfied by reading files from the fixed disk. (Such requirements are that Config.Sys or the Autoexec.Bat must come from fixed disk and be used with an operating system not from the fixed disk.) If action 54 is yes, action 56 examines the diskette 5 track zero, sector 1, head zero for a lower case y as the eleventh data byte. If yes, function 52 executes the boot record of the diskette 5. Such a boot record contains an operating system for maintenance, the lower case y so positioned being standard, at which time the permanent contents of RAM 13 can be revised by a skilled maintenance technician.

When action 51 is yes, diskette 5 is booted from only when certain content of diskette 5 is determined. Action 58 examines byte number 22 of the boot record of diskette 5 for a standard identification code at the standard location, and compares it with five possible identifications for IBM compatible operating systems. The earliest systems have a code of zero zero for either the 160 or the 320 KB (kilobyte) diskettes. Other such diskettes have different unique codes for their being diskettes of 360 KB, 720 KB, 1.44 MB, and 1.2 MB. If none of these codes appear, action 58 is no and function 52 executes the boot record. If action 58 is yes, action 60 determines if the identification code read in action 51 is that of the 160 or the 320 KB diskettes.

Since zero zero might well appear in a data diskette, in response to a yes from action 60, function 62 reads into RAM 13 the first sector of the file allocation table of diskette 5. The file allocation table is widely standard in being a table defining the linking of variable-length files. It begins with the sector immediately following the boot record, and that begins with one byte which is standardized as all ones or seven ones followed by an ending zero (FF or FE in hexadecimal notation) for the 160 and the 320 KB diskettes. In action 64 microprocessor 9 compares the byte for match with the FF and FE. When action 64 is yes, function 68 reads the first two entries of the directory into RAM 13, the location of the directory on those disks being directly known as it starts at the beginning of track zero, sector 4, head zero.

If action 60 was no, diskette 5 may be one of the other five types. Function 66 finds the directory of diskette 5 from information in the boot record, as is standard. Then function 68 reads the first two entries of the directory of diskette 5 into RAM 13.

In action 70 the reading of the directory information from the directory is examined for consistency with the content being a directory. The two primary checks are for the existence of the sector specified and the accuracy of the check bit in the sector against the content of the sector. These are standard checks. If action 70 is no, the boot record of diskette 5 is executed by function 52. If action 70 is yes, in action 72 microprocessor 9 reviews the content of the boot record of diskette 5 sequentially for capital COM in sequence. If that is not found, the content is then reviewed sequentially by microprocessor 9 for lower case com. Any occurrence of one or the other is a yes, terminating action 72. If the result of action 72 is no, function 52 executes the boot record.

When action 72 is yes, in action 74 microprocessor 9 compares the first eleven bytes of those directory entries with the content of the eight bytes prior to the COM or com found in action 72 as well as the COM or com found. If either of the directory entries match those eleven bytes, the result of action 74 is yes and function 52 executes the boot record of diskette 5.

If the result is no of the following: action 42, diskette boot request; action 44, diskette present; action 48, valid boot request; action 54, read fixed disk files; action 56, diagnostic boot record; or action 74, match xxxxxxxxcom; in action 78 a permanent memory bit of RAM 13 is examined which defines if booting from fixed disk is to occur. If yes, action 80 physically senses the fixed disk for it presence, as is conventional. If action 80 is no, function 82 executes the boot routine stored in ROM 11, which preferably is a specialized, but generally standard IBM DOS Operating System. If action 80 is yes, the boot record of the fixed disk is loaded into RAM 13 in function 84. Further intermediate actions are standard and not shown. In normal operation function 86 executes the fixed disk boot record. Execution of the boot record from diskette in function 52, from the ROM in function 82 and from the fixed disk in function 86 results in ready or error signal 88 to the computer operator, as is standard. A ready status after booting terminates POST, and the software in control of the computer is then the operating system loaded rather than POST.

Setting of the bit in RAM 13 defining that content is to be determined before booting as described results in diskettes 5 having data for IBM DOS compatible systems rarely being used for attempted booting, but that virtually all other diskettes will be attempted. Unusual operating systems therefore require no special operator action, while leaving a DOS compatible data diskette in the computer, a common occurrence, normally results in the computer booting from an alternative source. Thus, the error signal 88, which necessarily summons operator involvement, is avoided.

Permanent RAM bits 13 preferably are conventional battery-backed up memory, so that the status of the memory is maintained by battery while the computer is turned off. Other portions of RAM 13 need not have the permanent capability since the data in much of RAM 13, such as that carrying the operating system and application software, need not be permanent.

In a preferred embodiment the variable memory bits described to direct booting from various sources will be set under operator control in accordance with the patent applications recited in the second paragraph of this application under the heading "Related Patent Applications," which applications are hereby incorporated by reference.

Various modifications and changes in sequence of the operation will be apparent. Thus, the physical checking for diskette 5 presence is not essential since subsequent checks of data as described would reveal the absence of any diskette. If the mandatory booting from diskette 5 alternative is eliminated, the system would function well in the vast majority of circumstances, but the operator would not have the option of confirming that a given boot record would not load an operating system. Instead of exiting by a diagnostic diskette as described when conflicting uses of the fixed disk are found, a software algorithm could recognize the conflict and specify booting on the internal operating system. Since unforeseen lockups can occur in programs of this nature or from random errors, providing a mechanism to reach a diagnostic disk permits access by a technician which would be valuable even with that default algorithm included.

I claim:

1. A process for booting a computer system having both an external memory and an internal memory, said internal memory storing an operating system for said computer, comprising the steps of: loading data stored in an external memory into said computer system for operating said computer system, said step of loading comprising reading a boot record of said external memory to determine the presence of consecutive codes for c, o, and m in that order in said boot record, and when said reading of said boot record does not find the presence of said consecutive codes for com, executing said boot record and when said reading said boot record does find the presence of said consecutive codes for com, determining a predefined directory location of said external memory, comparing said consecutive codes for com and a predetermined number of characters in said external memory immediately preceding said consecutive codes for com with contents of said predefined directory location, executing said boot record when said comparison shows the same content, and branching to load an operating system from said internal memory when said comparison does not show the same content.

2. A computer system comprising:

a processor;

a diskette drive connected to and controlled by said processor for receiving and reading a diskette;

an internal memory connected to said processor for storing initiation data codes for controlling said processor to load an operating system from said diskette and for storing an operating system for said computer;

said diskette having a first and second predetermined areas for storing data;

said processor comprising means for searching said diskette for consecutive data codes representative of letters c, o and m in that order in said first predetermined area of said diskette;

said processor, under the control of said initiation data codes, comprising means for comparing for and determining a failure to find said consecutive codes;

said means for comparing responsive to a determination of failure further controlling said processor to attempt to load any operating system which may be resident on said diskette;

said means for comparing further comprising means for determining the presence of said consecutive codes, and for generating a compare yes signal;

said processor responsive to said compare yes signal to compare said consecutive codes and data bytes of a predetermined number immediately preceding said consecutive codes with data stored in said second predetermined area of said diskette, said processor producing a no compare signal when said data stored in said second predetermined area fails to contain data identical to said predetermined number of data bytes and said consecutive codes and a compare equal signal if said predetermined number of data bytes and said consecutive codes are found to be identical with a data sequence in said second predetermined area;

said processor further comprising means responsive to no compare and compare equal signals for branching to loading said operating system from said internal memory when said no compare signal is present and for initiating loading of an operating system from said diskette when a compare equal signal exists.

3. The computer system as in claim 2 in which said second predetermined area is the location of a directory of said diskette containing at least two entries.

4. The computer system as in claim 2 in which said predetermined number of bytes immediately preceding said consecutive codes for com is eight and said second predetermined area is the location of the first two entries in the directory of said diskette when said diskette contains an IBM DOS or compatible operating system.

5. The computer system as in claim 2 wherein said processor comprises means for examining data stored in said first predetermined area prior to said branching or initiating loading, for identity with data stored in said second predetermined area containing a directory and in which said processor also comprises means for attempting to load an operating system from said diskette when said identity is not found.

* * * * *